United States Patent [19]
Schlough

[11] Patent Number: 5,453,051
[45] Date of Patent: Sep. 26, 1995

[54] CORN COB MILL

[76] Inventor: Stuart E. Schlough, 1655 Connors Rd., Marshall, Wis. 53559

[21] Appl. No.: 169,945

[22] Filed: Dec. 20, 1993

[51] Int. Cl.$^6$ .................................................... A01F 11/06
[52] U.S. Cl. ................................................ 460/46; 460/113
[58] Field of Search ............................ 460/46, 28, 39, 460/45, 110, 113, 126, 141, 142; 56/14.5, 14.6

[56] References Cited

U.S. PATENT DOCUMENTS

| | | | |
|---|---|---|---|
| 3,536,077 | 10/1970 | Stott et al. | 460/46 |
| 5,138,826 | 8/1992 | Hobbs | 460/126 X |

FOREIGN PATENT DOCUMENTS

| | | | |
|---|---|---|---|
| 2943597 | 3/1983 | Germany | . |

OTHER PUBLICATIONS

Promotional material, Pöttinger, Pöttinger Mex Spezil Maiskolbenschrot–Vollernter (in German) (date unknown).
Promotional material by Automatic Equipment Manufacturing Company, Automatic Roller Millers (1985).
Promotional material by Farmhand, Farmhand's New Roller–Blower (1982).
Promotional material by Farmhand, Farmhand Grinder–Blower (date unknown).
Promotional material by Henke, Henke Roller Mills (date unknown).
Promotional material by Roskamp Manufacturing, Inc., Roskamp Portable Feed Processing Centers (date unknown).
Promotional material by Kasten Manufacturing Corp., Kasten Built Bold for More Efficient Feeding (1982).
Promotional material by Fox Brady, New Fox Model 4800 Particulator (date unknown).
Operator's Manual, New Idea Farm Equipment Company, New Idea No. 317 Grinder (date unknown).

*Primary Examiner*—Terry Lee Melius
*Attorney, Agent, or Firm*—Quarles & Brady

[57] ABSTRACT

An apparatus for forming a forage mixture of corn kernels and cobs in a field of high-moisture corn includes a separating cylinder and beaters, grids through which cracked and crushed corn material may pass, a roller mill for forming this material into particles of a size that is uniform in size. The apparatus can process more than 80% of the cobs taken in.

23 Claims, 2 Drawing Sheets

CORN COB MILL

FIELD OF THE INVENTION

The present invention relates to the field of farm equipment, and more particularly to devices for converting corn cobs and kernels into a forage mix.

BACKGROUND OF THE INVENTION

Forage, prepared from either alfalfa and other grasses or from whole corn plants, is a desirable nutrient- and protein-rich feed for farm animals. Forage gathered from grass or corn fields undergoes anaerobic fermentation in silos. A high moisture content in the ensiled forage is desirable as it promotes efficient fermentation.

Preparation of a high-moisture corn cob mix from ear corn using existing technologies involves picking or shelling the corn, transporting the ear or shelled corn to a stationary hammer or roller mill adjacent to a silo, processing the ear or shelled corn through the mill, and ensiling the processed corn by blowing the mixture into the silo. In this approach, separate equipment is required for the collecting, processing and ensiling steps.

At present, the corn is collected from the field either using an ear corn picker or using a combine. When an ear corn picker is used, ears separated from the stalks and husks (fodder) are transported in wagons by the farmer to the stationary mill where the corn is shelled and the cobs are broken as the mixture is ensiled. The ear corn, which is high in moisture at harvest, is not easily transferred from the wagon to the ensiling mill. Rather, the process requires skilled machinery operators both in the field and at the processing mill, where the rate at which ear corn is fed into the mill must be carefully controlled to prevent clogging.

In contrast to the ear corn picker, a combine can represent a significant labor savings in collecting corn plant material from the field. However, combines are designed to yield primarily kernels separated from crushed cobs. While about 20 to 30%, or even 40%, of the cobs taken up and crushed can be forced into the mix, this still represents a 60–80% waste of valuable and nutritious feed material from the mix.

Moreover, combines are designed to operate on dry plant material having a moisture content of about 15 to 25%, while the preferred moisture content of a corn-cob forage mix for ensiling is above 25% and may be in the range of 30 to 40% or even higher. In general, the separated free-flowing, low-moisture grain prepared by a combine is augered to an on-board grain tank then transferred to trucks or wagons designed to handle free flowing shelled corn. This free flowing mixture is generally too dry for good ensiling. Therefore, the combine improved corn handling but at moisture level less than desirable for ensiled feed.

Accordingly, a desirable apparatus would harvest corn material having a moisture content adequate for producing silage, and would convert the harvested corn material into a high-quality, high-moisture forage mix more efficiently and at lower equipment and labor cost than can now be accomplished.

SUMMARY OF THE INVENTION

The present invention is summarized in that an apparatus for forming a silage mix from high moisture ear corn includes a rotatable separating cylinder, one or more rotatable separating beaters, and sizing grids positioned beneath the cylinder and beaters, the grids having openings through which corn kernels and particulate cobs of a desired size may pass by centrifugal force. Kernels and cobs that pass through the grids are rolled through an associated roller mill to form high-moisture corn-cob mix particles that can be blown through an outlet into an associated receiving container.

It is an object of the present invention to provide an apparatus for in-field processing of ear corn into a high-quality, high-moisture mix of corn cobs and kernels.

It is another object of the present invention to eliminate the need for a separate stationary processing mill for processing harvested corn.

It is advantage of the present invention that high-moisture ear corn may be utilized as a starting material.

It is another advantage of the present invention that the mix formed by the apparatus can be blown into an associated receiving container as it is formed.

It is also an advantage of the present invention that the apparatus produces a corn-cob mix that does not disperse when blown to an associated receiving container.

It is yet another advantage of the present invention that the mix blown into the receiving container by the apparatus is readily transferred mechanically into a silo without requiring skilled labor. In contrast, skilled labor is required to unload the products of an ear corn picker or combine into a stationary processing mill at a silo.

It is yet another advantage of the present invention that it may be utilized in combination with existing farm equipment such as tractors and forage wagons.

It is yet another advantage of the present invention that it operates with lower power requirements than existing forage processors.

Other objects, features, and advantages will become apparent from the following specification when considered in light of the accompanying drawings.

DETAILED DESCRIPTION OF THE INVENTION

The apparatus of the present invention can accomplish, in a single apparatus, all of the steps involved in forming a high-moisture feed mix of kernels and cobs that heretofore have required two separate devices. The apparatus produces a high-moisture silage mix that can be blown directly from the apparatus into a receiving container. The receiving container is preferably, though not essentially, a standard forage wagon trailed behind the apparatus. Most dairy and beef cattle farms already have such multi-purpose wagons on hand, thus, there is no need to purchase a dedicated container to receive the processed mix.

The apparatus produces a high-moisture mix of corn kernels and cobs that is also directly transferable from the receiving container to a silo without additional processing and without the involvement of skilled labor, as most such receiving containers used on farms are provided with automatic ensiling means.

In addition, the apparatus of the present invention delivers a higher percentage of input corn cobs into the mix than has been previously possible when using a conventional corn combine. Combines can yield corn-cob mixes that include only about 40% of the input cobs. The present invention can incorporate more than 80%, and typically incorporates at least about 90%, of the cobs into the high-moisture mix.

Because the intended use of the apparatus is to produce a high-moisture corn-cob mix, the moisture of the corn taken in by the apparatus can be up to about 45%, and is preferably in the range of 25–40%. In contrast, combines have problems at moistures above 30%.

Dedicated corn pickers can harvest ear corn at moistures above 30%, but the ear corn is not a free flowing material at this moisture level, and is much more difficult to handle at higher moisture levels.

Figure 1:
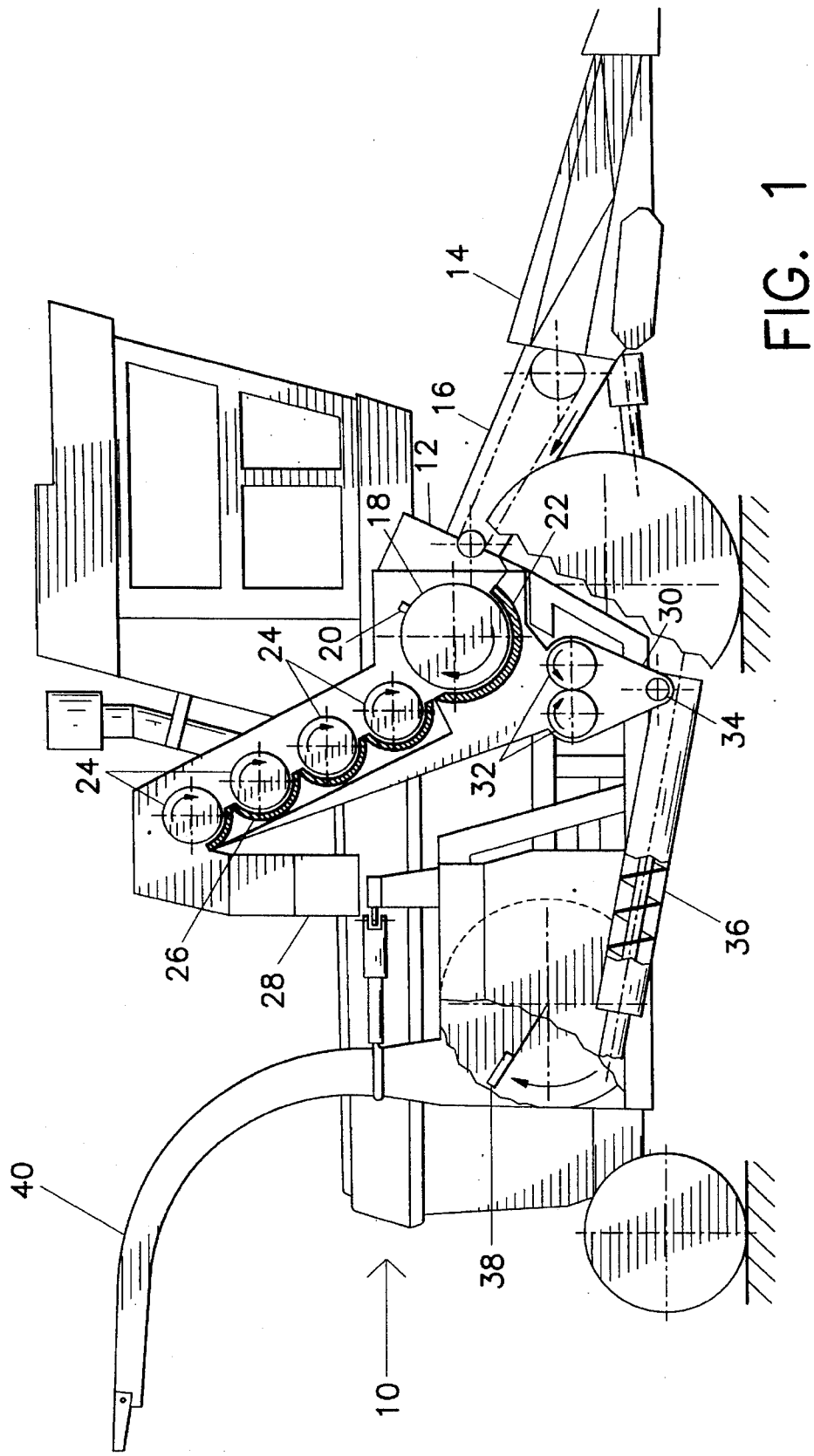
FIG. 1 is a cut away side view of a self-propelled embodiment of the apparatus of the present invention.

The apparatus 10 is shown in FIG. 1, in a first preferred embodiment in which the apparatus 10 is self-propelled. The corn-processing portion of the apparatus 10 is provided within a housing 12. At one end of the housing 12, an intake portion of the apparatus 10 is provided for taking ear corn and fodder material into the corn-processing portion. A delivery portion conveys the corn-cob mix from the corn-processing portion to the receiving container.

The intake portion preferably includes a corn head 14, of a type known to the art, connected to a first end of a feederhouse 16, that can be, for example, an undershot design. A second end of the feederhouse 16 is positioned with respect to the housing 12 so as to deliver corn material from the feederhouse 16 to the corn-processing portion inside the housing 12.

Inside the housing 12, and near the intake portion is a rotatable separating cylinder 18 that receives corn material from the intake portion. Mounted to the surface of the separating cylinder 18 are a plurality of rasp bars 20 to aid in the shelling and cracking of kernels and the breaking of cobs. Preferably eight rasp bars 20 are equally spaced around the circumference of the separating cylinder 18, although more or fewer rasp bars could also be used.

The separating cylinder 18 preferably has a diameter in the range of 22–24 inches and a width in the range of 36–50 inches, though such dimensions are not critical. It is important that the velocity of outer tips of the rasp bars 20 on the rotatable separating cylinder 18 be sufficiently great to perform the shelling, cracking and breaking tasks. To perform these tasks, the velocity at the outer edge tip of the separating cylinder is higher than would be used in comparable cylinders in a combine to separate grain. Outer edge tip velocities of greater than 4,000 feet per minute, and preferably velocities in the range of 4,000 to 6,000 feet per minute are sufficient. A separating cylinder having a diameter in the range of 22 inches–24 inches achieves an outer tip velocity of 4,000– 6,000 feet per minute when it rotates at 650–1000 revolutions per minute. One of ordinary skill will appreciate that the outer tip velocity can be varied by changing the diameter of the separating cylinder 18 or by changing its rate of rotation or both.

Positioned beneath and spaced apart from the separating cylinder 18 is a grid or concave 22 having openings therethrough. The openings are of sufficient size to allow the corn kernels and broken cobs to pass through. The particular dimensions of the concave openings are not intended to limit the invention, although the size of the opening is selected with regard to the desired size of particles that can be processed by the roller mill, described in detail below. Rectangular openings of 9/16 inch by 1¼ inch are preferred, as broken cobs that can pass through such openings are readily formed into particles of desired size.

The space between the rotatable separating cylinder 18 and the concave 22 is sufficiently narrow to promote the shelling and cracking of kernels and the breakage of the corn cobs into particles small enough to pass through the openings in the concave 22. The rasp bars 20 of the separating cylinder 18 facilitate entry of the corn material from the intake portion into the space between the separating cylinder 18 and the concave 22. Preferably, the space between the separating cylinder 18 and concave 22 narrows from about 1–1¼ inches where closest to the intake portion to about 3/8–5/8 inch where furthest from the intake portion.

Also provided within the housing is a plurality of separating beaters 24 to receive the kernel and cob material that was not sufficiently separated beneath the separating cylinder 18. The separating beaters 24 are preferably blade-type beaters, with blades being evenly distributed about the surface of the beater 24. Beneath each separating beater 24 is a grid or separating grate 26 having holes therethrough of the same or similar dimension to those of the concave 22 for receiving the crushed kernels and cobs in the same manner as the concave 22. The grates 26 may be rod and bar-type grates. The distance between the beaters 24 and the grates 26 is small, approximately ½ inch, for further separation of the broken corn material.

Neither the number of separating beaters 24 provided nor their diameter or rotation speed is critical. It is only necessary that the beaters 24 apply sufficient overall force on the corn material to force through the grates 26 a majority of the kernels and cobs left unprocessed by the separating cylinder 18. This can be accomplished, for example, with four small (10") blade-type beaters rotating at about 650 rpm, or with fewer larger beaters rotating more rapidly arranged in a linear array so that at each transfer of corn material from one beater to the next, fewer and fewer cobs and kernels remain that have not passed through either the concave 22 or the grates 26.

It is advantageous that there be coordinate rotation of the separating cylinder 18 and the separating beaters 24, to maintain a constant velocity ratio between the two. This may be accomplished using a single chain drive (not shown) connecting the cylinder 18 and the beaters 24, or by driving the two independently. Sufficient power is required to allow the separating cylinder 18 and beaters 24 to crush and break the kernels and cobs to a particle size that can fit through the concave and separating grates. The cylinder and beaters may, if desired, be operated at differential speeds to facilitate rapid separation in the later stages. In one machine tested, the separating cylinder 18 was run at 900 rpm while the separation beaters 24 ran at 650 rpm.

Beyond the separating beater 24 that is farthest from the separating cylinder 18, a fodder discharge outlet 28 is provided for discharging from the apparatus corn material that has not passed through the concave 22 or grates 26 after passing the array of beaters 24. The material discharged through the outlet 28 is primarily husks and some stalks, with a few kernels and cobs mixed in. The inner surface of the housing 12 defines a deflector beneath the concave 22 and the separating grates 26 for funneling, under the force of gravity, the crushed cobs and kernels that have passed through the openings toward a roller mill 30, comprised of two rollers 32, for further compressing the particulate kernels and cobs. The two rollers 32 comprising the roller mill 30 are provided on their surface with grooves for engaging the cobs and kernels to roll the cob and kernel particles to a size that is most palatable for the cow. Rollers provided with four, five or six 60° grooves per inch have been determined to function adequately for corn cob mix. To ensure that the roller mill 30 does not clog, the rollers 32 rotate at 50 to 100 rpm differential speed relative to each other. No particular speeds are required, though 500 rpm to 1000 rpm is sufficient for two 10 inch rollers to handle the volume of material delivered by the embodiments described herein. The roller mill 30 is preferably full-width to the apparatus (approximately 36/48 inches), to accommodate the large volume of cobs and kernels entering the mill without clogging. The diameter of the rollers 32 is not critical, though the diameter of each must be sufficiently large to accommodate the throughput. As was the case with the separating portion of the apparatus, one of ordinary skill can readily determine an optimal combination of roller diameter and speed to accomplish the intended rolling function. Although the roller mill 30 is of a type known to the art, it has been shown by the present inventor that to obtain a corn-cob mix having the most preferred particle size and moisture properties, it is advantageous that the distance between the rollers 32 be kept in the range of 0.03–0.05 inches at the pinch point. By doing so, the product of the mill is uniform in size, thus preventing separation in the silo and preventing animals from selecting kernels over cobs in their feed.

Beyond the roller mill 30 is the delivery portion of the apparatus for delivering the rolled corn-cob mix from an outlet of the apparatus 10 to a receiving container. The delivery is preferably accomplished by conveying the rolled corn-cob mix to a blower and blowing the mix into a trailing forage wagon, although other means for delivering the rolled mix are possible.

In such a preferred embodiment, the delivery portion includes a conveyer, such as collection auger 34 of sufficient capacity to transport the rolled cobs and kernels to at least one feed auger 36. The feed auger(s) 36 connect to a blower fan 38 and blower spout 40 such as would be used on a standard forage gathering apparatus.

A collection auger of 5 inch diameter is adequate to handle the corn-cob mix output of a 48 inch wide roller mill 30 rolling at 500 and 1000 rpm. The diameter of the feed auger or augers 36 is not critical, although the auger 36 must accommodate the material received from the collection auger 34 without clogging or backing up. A single feed auger of 8 inch diameter is adequate to handle the corn-cob mix output of a 48 inch wide roller mill. If more than one feed auger 36 is used, they need not be of identical diameter.

In the first preferred embodiment thus described, the apparatus is self-propelled and includes a power source having sufficient horsepower to accommodate the operations described above. A preferred self-propelled apparatus is 48 inch wide and can process four to six rows of corn at once and pull an eight to twelve ton forage wagon with a power source supplying approximately 150–175 horsepower. A comparable forage harvester would require 200–250 horsepower. A preferred hook-up for the self-propelled embodiment would be to a standard New Idea Unisystem, power unit although other possible hook-ups are known to the art.

Figure 2:
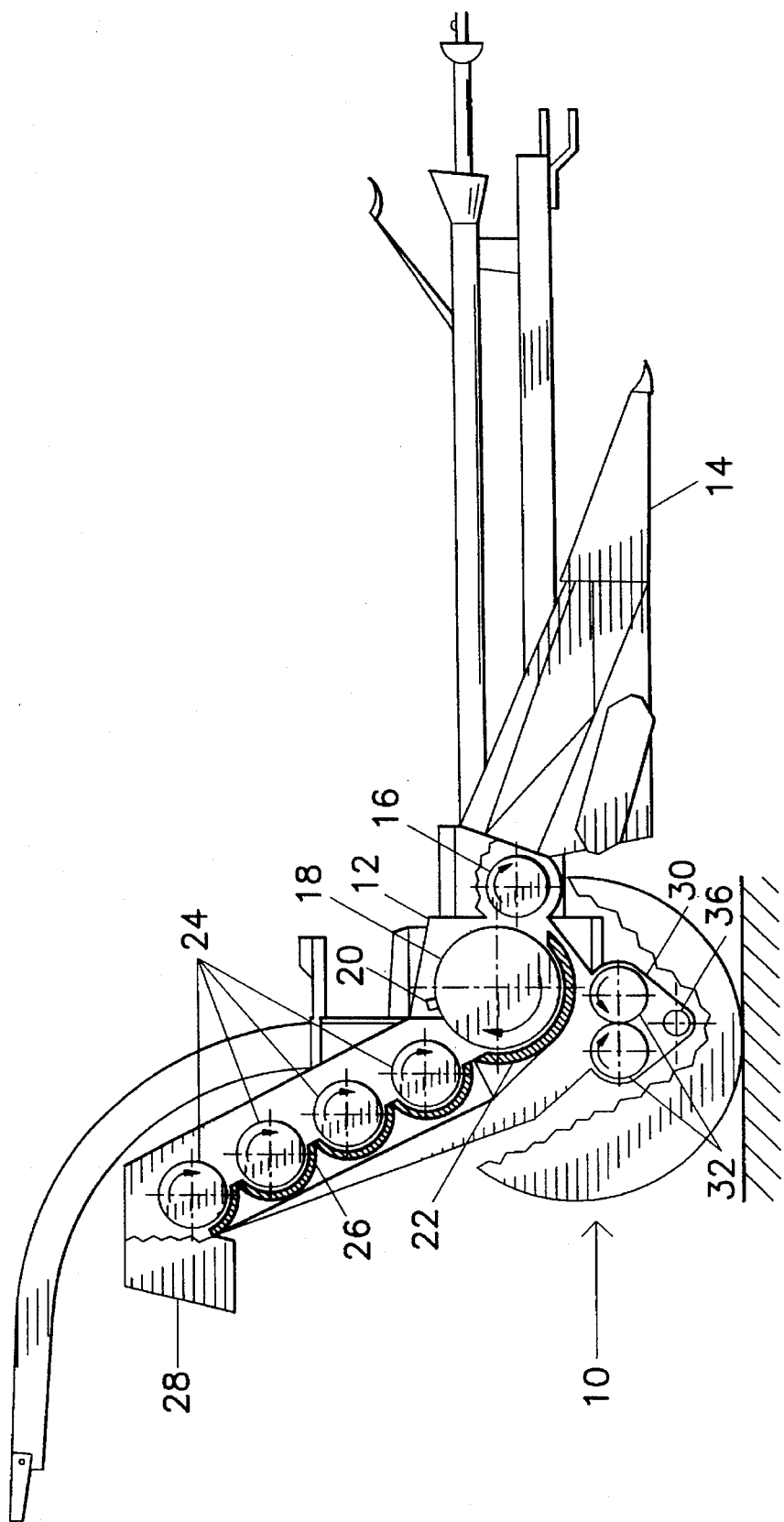
FIG. 2 is a cut away side view of a pull-type embodiment of the apparatus of the present invention.

A second embodiment of the present invention, shown in FIG. 2, is a pull-type apparatus that can be utilized in place of a standard pull picker. The pull-type embodiment draws its power from an associated powered vehicle by draw bar and PTO hook-ups, and uses about 130 horsepower to power a 3-row, 36 inch wide apparatus. The pull-type apparatus would require two hydraulic or electric circuits; one to control the blower spout and a second to raise and lower the corn head.

Other than in its power requirements, the pull-type apparatus includes all of the elements described in connection with the self-propelled embodiment. The reference numbers of FIG. 1 are used to indicate comparable parts in the pull-type embodiment of FIG. 2. In addition, the pull-type unit may be provided with a feed beater 42 instead of the feederhouse to feed the ear corn into the separating cylinder, as shown, to promote the flow of corn material into the apparatus.

In both embodiments, the capacity of the apparatus is limited by the available power, rather than by the rate of corn intake.

In use, the apparatus, in either embodiment, moves through a corn field attached to a powered vehicle. Corn is collected by the corn head portion. The corn head 14 removes ears of corn from corn stalks. The ears are delivered, by auger, to the feederhouse or feed beater 16 which presents the ears to the corn processing portion of the apparatus. The ears are drawn, by the rasp bars 20 of the rapidly rotating separating cylinder 18, into the space between the cylinder 18 and the concave 22, whereupon the corn kernels are shelled, and the cobs are broken. A large percentage of the cobs and kernels pass through the concave openings and fall by gravity to the roller mill 30. The corn material that cannot pass through the concave 22 is swept to the separating beaters 24, which further separates the kernels and cobs so that most will pass through the grates 26.

Other non-cob, non-kernel material passes from the beaters 24 out of the apparatus 10 through the fodder discharge outlet 28. This material may later be recovered for other uses such as corn fodder bales.

The kernels and cobs that have passed through the concave 22 and grates 26 are crushed, cracked, and sized between the rollers 32 of the roller mill 30. The rolled mix passes from the corn processing portion into the delivery portion of the apparatus by gravity. In the delivery portion, the collection auger 34 transports the mix to the feed auger 36 that feeds the standard blower fan 38 and blower spout 40. The corn-cob mix is blown from the spout 40 to the receiving container trailing the apparatus.

It is to be understood that the present invention is not limited to the particular configurations and embodiments disclosed, but embraces all such variations and modifications as come within the scope of the following claims.

I claim:

1. An apparatus for forming a blowable silage mix from high moisture ear corn, the apparatus comprising:

a housing;

a corn head connected to one end of the housing for taking corn into the housing;

a rotatable separating cylinder within the housing; a concave, positioned beneath and spaced apart from the separating cylinder, the concave having openings therethrough, wherein the space between the concave and the separating cylinder is sufficiently narrow to shell the kernels and to break the cobs into particles small enough to pass through the openings in the concave and of a size similar to the size of the kernels;

a plurality of rotatable separating beaters within the housing for receiving the corn material that has not passed through the openings in the concave beneath the separating cylinder;

a plurality of separating grates, one grate being positioned beneath and spaced apart from each separating beater, each grate having openings therethrough through which particulate corn cobs and kernels can pass wherein the space between the grate and the beater is sufficiently narrow to further separate the corn and cob material;

a roller mill within the housing and positioned beneath the concave and the grates, the roller mill comprising a pair of rotatable cylindrical rollers for receiving and rolling the corn cobs and kernels that pass through the openings in the concave and the openings in the grates, the rollers being rotatable at a differential speed and being spaced apart by a distance of between about 0.03 to 0.05 inches so as to yield a corn cob mix having particles of a uniform size thus inhibiting separation in the silo and preventing a cow being fed the silage mix from selecting corn kernels over cobs; and a discharge blower for blowing the rolled corn cob mix into the receiving container.

2. An apparatus as claimed in claim 1 wherein the rotatable separating cylinder comprises eight rasp bars.

3. An apparatus as claimed in claim 1 wherein the rotatable separating cylinder rotates at a rate in the range of 650–1000 revolutions per minute.

4. An apparatus as claimed in claim 1 wherein the diameter of the rotatable separating cylinder is in the range of 22 inches–24 inches.

5. An apparatus as claimed in claim 1 wherein the width of the rotatable separating cylinder is in the range of 36 inches–48 inches.

6. An apparatus as claimed in claim 1 wherein the space between the separating cylinder and the concave is between 1 inch and 1¼ inch where closest to the intake portion and between ⅜ inch and ⅝ inch where furthest from the intake portion.

7. An apparatus as claimed in claim 1 wherein the openings on the concave have dimensions of about 9/16 inch ×1¼ inches.

8. An apparatus as claimed in claim 1 wherein the concave is a bar and rod type concave.

9. An apparatus as claimed in claim 1 wherein the separating beaters are blade type beaters.

10. An apparatus as claimed in claim 1 wherein there are four separating beaters.

11. An apparatus as claimed in claim 1 wherein the diameter of the separating beaters is in the range of 10 inches–12 inches.

12. An apparatus as claimed in claim 1 wherein the separating beaters rotate at 650 revolutions per minute.

13. An apparatus as claimed in claim 1 wherein the separating grates are bar and rod concave type grates.

14. An apparatus as claimed in claim 1 wherein the openings on the separating grates have dimensions of about 16 inch×1¼ inch.

15. An apparatus as claimed in claim 1 wherein the diameter of the rollers is 10 inches.

16. An apparatus as claimed in claim 1 wherein the rollers are full width to the apparatus.

17. An apparatus as claimed in claim 1 wherein the outer surface of the cylindrical rollers is provided with four, five or six grooves per inch.

18. An apparatus as claimed in claim 17 wherein the outer surface is provided with four 60° grooves per inch.

19. An apparatus as claimed in claim 1 wherein the rotation rates of the rollers are 500 rpm to 1000 rpm.

20. An apparatus as claimed in claim 1, wherein the apparatus further comprises:

a feederhouse connected to the corn head, the feeder house being positioned so as to deliver corn stalks to the separating cylinder.

21. An apparatus as claimed in claim 1, wherein the apparatus further comprises:

a conveyor positioned between the roller mill and the discharge blower.

22. An apparatus as claimed in claim 21 wherein the discharge blower comprises a blower fan and a blower spout connected to the blower fan.

23. An apparatus as claimed in claim 21 wherein the conveyor comprises a collection auger and at least one feed auger.

* * * * *